United States Patent
Berger et al.

(10) Patent No.: US 8,380,748 B2
(45) Date of Patent: Feb. 19, 2013

(54) MULTIDIMENSIONAL DATA CUBES WITH HIGH-CARDINALITY ATTRIBUTES

(75) Inventors: Alexander Berger, Sammamish, WA (US); Mosha Pasumansky, Redmond, WA (US); Amir Netz, Bellevue, WA (US); Akshai M. Mirchandani, Redmond, WA (US); Marius Dumitru, Issaquah, WA (US); Cristian Petculescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 12/042,674

(22) Filed: Mar. 5, 2008

(65) Prior Publication Data

US 2009/0228430 A1 Sep. 10, 2009

(51) Int. Cl.
*G06F 7/00* (2006.01)
*G06F 17/30* (2006.01)

(52) U.S. Cl. ...................................... 707/802
(58) Field of Classification Search ................. 707/605, 707/802
See application file for complete search history.

(56) References Cited

U.S. PATENT DOCUMENTS

| | | | |
|---|---|---|---|
| 5,761,652 A * | 6/1998 | Wu et al. | 1/1 |
| 5,802,521 A * | 9/1998 | Ziauddin et al. | 1/1 |
| 5,940,818 A | 8/1999 | Malloy et al. | |
| 6,301,579 B1 | 10/2001 | Becker | |
| 6,691,140 B1 | 2/2004 | Bogrett | |
| 6,807,518 B1 | 10/2004 | Lang | |
| 6,980,980 B1 | 12/2005 | Yeh | |
| 7,133,876 B2 * | 11/2006 | Roussopoulos et al. | 707/752 |
| 7,139,766 B2 | 11/2006 | Thomson et al. | |
| 7,610,300 B2 * | 10/2009 | Legault et al. | 1/1 |
| 2004/0002981 A1 * | 1/2004 | Bernhardt et al. | 707/100 |
| 2004/0267799 A1 | 12/2004 | Petculescu et al. | |
| 2005/0283494 A1 | 12/2005 | Colossi | |

OTHER PUBLICATIONS

Hyperion, "Essbase XTD Integration Services Release 7.0," 8 pages, copyright 1998-2003, http://dev.hyperion.com/techdocs/eis/eis_70/isnwfet.pdf.
DB2 Alphablox, Version 8.4, "Custom Drillthrough Support Using DB2 Alphablox Relational Reporting," Oct. 29, 2007, 2 pages, http://publib.boulder.ibm.com/infocenter/ablxheld/v8r4m0/index.jsp?topic=/com.ibm.db2.abx.dev.doc/abx-t-develop-226.html.
Database Journal, "Solving Data Center Complexity with Microsoft System Center Configuration Manager 2007," 6 pages, Oct. 29, 2007, http://www.databasejournal.com/features/mssql/article.php/10894_3552186_2.
Cognos Applix, "Quick and Easy Navigation," 4 pages, Oct. 29, 2007, http://www.applix.com/product/data-navigation.asp.

* cited by examiner

*Primary Examiner* — James Trujillo
*Assistant Examiner* — Jeffrey Chang
(74) *Attorney, Agent, or Firm* — Shook Hardy & Bacon L.L.P.

(57) ABSTRACT

Computer-readable media, systems, and methods for building a multidimensional data cube having one or more high-cardinality attributes are described. In embodiments, data is extracted from one or more databases. It is determined that one or more instances of the data are fact data and one or more instances of the data are dimension data. Each member of the fact data is one instance of a dimension and each instance of the dimension data includes an attribute for grouping the fact data. Moreover, in embodiments it is determined that one or more instances of the dimension data are high-cardinality attributes. The one or more high-cardinality attributes are processed with fact data and stored in fact tables on a computer storage medium.

18 Claims, 5 Drawing Sheets

| ORDER NO | DATE | PRODUCT | STORE | STATE | REGION |
|---|---|---|---|---|---|
| 00000001 | 1/1/00 | A | SEA 1 | WA | W |
| 00000002 | 2/1/00 | B | SEA 1 | WA | W |
| 00000003 | 3/1/00 | C | SEA 6 | WA | W |
| 00000004 | 4/1/00 | A | KC 3 | MO | MW |
| 00000005 | 5/1/00 | C | NY 2 | NY | NE |
| 00000006 | 6/1/00 | A | SF 1 | CA | W |
| 00000007 | 7/1/00 | B | KC 5 | MO | MW |
| 00000008 | 8/1/00 | B | LA 8 | CA | W |
| 00000009 | 9/1/00 | C | SF 4 | CA | W |
| 00000010 | 10/1/00 | A | KC 1 | MO | MW |
| ... | | | | | |
| N-2 | | | | | |
| N-1 | | | | | |
| N | | | | | |

MULTIDIMENSIONAL DATA CUBES WITH HIGH-CARDINALITY ATTRIBUTES

BACKGROUND

In various database querying environments, dimensions may arise that have a cardinality at or near the cardinality of the fact data. For instance, in a business database, the dimension attribute "order number" would likely have a unique order number for every order stored in the database. This is in contrast to other dimension attributes such as, for instance, the "region" of the store in which the order took place. The region would be limited to a much smaller cardinality, such as five regions for the entire United States (e.g., Northeast, Southeast, Midwest, South, and West). Where there are 100 million orders, the order number dimension will have a cardinality of 100 million, whereas the region dimension will have a cardinality of five. Unfortunately, the existence of high-cardinality attributes causes various problems when multidimensional data cubes are built from the database because traditional dimension data structures become overly burdened by a high-cardinality dimension.

SUMMARY

Embodiments of the present invention relate to computer-readable media, systems, and methods for generating and querying a multidimensional data cube with high-cardinality attributes. In embodiments, the high-cardinality dimension will be processed and stored as fact data. Upon querying the multidimensional data cube based on one or more attributes (other than the high-cardinality attributes), the high-cardinality attributes will be materialized and the information (here the order number information) will be presented to the user as if it were a typical, or non-high-cardinality, attribute.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention relate to computer-readable media, systems, and methods for generating and querying a multidimensional data cube with high-cardinality attributes. In various database querying environments, dimensions may arise that have a cardinality at or near the cardinality of the fact data. For instance, in a business database, the dimension attribute "order number" would likely have a unique order number for every order stored in the database. This is in contrast to other dimension attributes such as, for instance, state of the store in which the order took place. The state would be limited to a much smaller cardinality, such as fifty states for the entire United States. Where there are 100 million orders, the order number dimension will have a cardinality of 100 million, whereas the state dimension will have a cardinality of fifty. In these instances, the high-cardinality dimension (here the order number dimension) will be processed and stored as fact data. When building the multidimensional data cube from one or more fact tables and one or more dimension tables, embodiments will not build the high-cardinality dimension attribute as it would other dimension attributes. Instead, the high-cardinality attribute is un-materialized at build time. In embodiments, upon querying the multidimensional data cube based on one or more attributes (other than the high-cardinality attributes), the high-cardinality attributes will be materialized and the information (here the order number information) will be presented to the user as if it were a typical, or non-high-cardinality, attribute. Thus, it will appear to the user as if order number were a dimension, although behind the scenes the order number dimension is handled like fact data instead of dimension attribute data.

Accordingly, in one aspect, the present invention is directed to one or more computer-readable media having computer-executable instructions embodied thereon that, when executed, perform a method for building a multidimensional data cube having one or more high-cardinality attributes. The method includes extracting data from one or more databases, determining that one or more instances of the data are fact data, and determining that one or more instances of the data are dimension data. Each member of the fact data is one instance of a dimension and each instance of the dimension data includes an attribute for grouping the fact data. Further, it is determined that one or more instances of the dimension data are high-cardinality attributes. Still further, the one or more high-cardinality attributes are processed as the fact data to create one or more high-cardinality attribute tables that resemble one or more fact table structures and the one or more high-cardinality attribute tables are stored as one or more fact tables on a computer storage medium.

In another aspect, the present invention is directed to a method for querying a multidimensional database having one or more high-cardinality attributes. The method includes receiving a query including an identification of one or more dimensions and analyzing the multidimensional database based upon the one or more dimensions. The method further includes materializing data from one or more fact tables, materializing data from one or more high-cardinality attribute tables, and communicating a report including one or more instances of fact data corresponding to the one or more dimensions. In this aspect, the multidimensional database includes one or more fact tables having the fact data, wherein each member of the fact data is one instance of a dimension. The multidimensional database also includes one or more dimension tables having dimension data, each instance of the dimension data including an attribute for grouping the fact data. Still further, the multidimensional database includes one or more high-cardinality attribute tables having high-cardinality attributes, the one or more high-cardinality attribute tables structured and stored as the one or more fact tables.

In yet another aspect, the present invention is directed to one or more computer-readable media having computer-executable instructions embodied thereon that, when executed, perform a method for building a multidimensional data cube having one or more high-cardinality attributes. The method includes extracting data from one or more databases, determining that one or more instances of the data are fact data, and determining that one or more instances of the data are dimension data. Each member of the fact data is one instance of a dimension and each instance of the dimension data includes an attribute for grouping the fact data. Further, the method includes determining that one or more instances of the dimension data are high-cardinality attributes. The cardinality of the one or more high-cardinality attributes is the same as the cardinality of the fact data. The method further includes processing the fact data to create one or more fact tables, processing the dimension data, other than the high-cardinality attributes, to create one or more dimension tables, and processing the one or more high-cardinality attributes as the fact data to create one or more high-cardinality attribute tables that resembles one or more fact tables. Still further, the method includes storing the one or more fact tables and the one or more dimension tables on a computer storage medium, and storing the one or more high-cardinality attribute tables as one or more fact tables on the computer storage medium.

Having briefly described an overview of embodiments of the present invention, an exemplary operating environment is described below.

Figure 1:
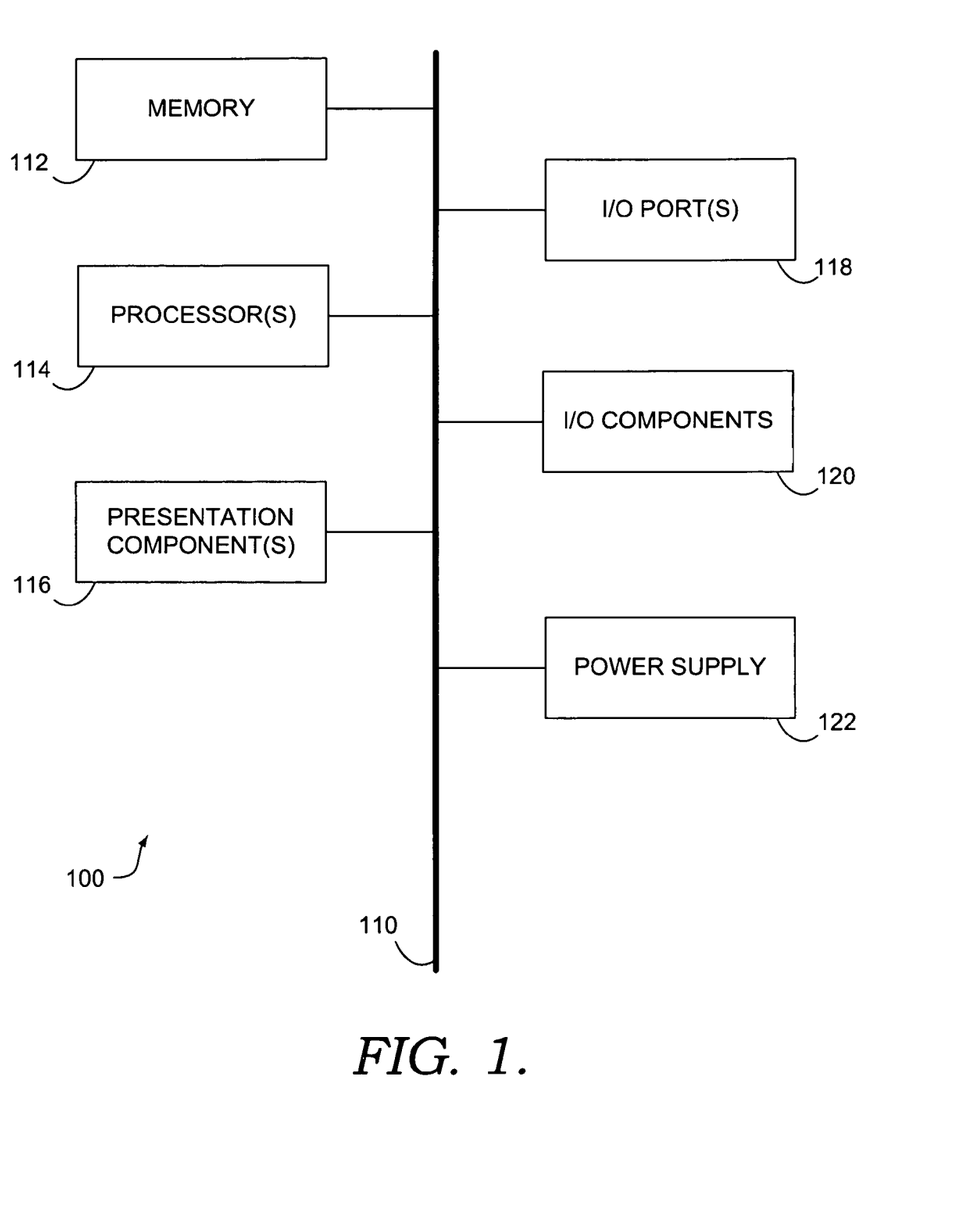
FIG. 1 is a block diagram of an exemplary computing system environment suitable for use in implementing the present invention.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. The phrase "computer-usable instructions" may be used herein to include the computer code and machine-usable instructions. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Before engaging in a discussion of specific details of multidimensional data cubes with high-cardinality attributes, an overview discussion will be presented to help illustrate the context and functionality of embodiments of the present invention. As an initial matter, those having skill in the art will understand and appreciate that, when building a multidimensional data cube for use with online analytical processing, among other things, information is stored either as fact data or as dimension data. Using business sales as an example, the fact data may include information related to each instance of a sale. Dimension data, on the other hand, includes the columns and row headings, or groups of information. As used herein, dimension data refers to dimension information collectively and the terms dimension and attribute may be used interchangeably to refer to a single instance of the dimension data. In the business sales example, where there is one record having order number 00001; date 01/01/00; product A; store 5; state WA, etc., the fact data will include the set of {00001; 01/01/00; A; 5; WA}, whereas the dimension data will include {order number; date; product; store; state}. This information may be initially stored in one database or in many databases and, as will be understood and appreciated by those having skill in the art, in embodiments, the databases are relational databases. Using this example, and assuming there are 100 million sales recorded, there will be 100 million instances of fact data. In other words, the fact data will have a cardinality of 100 million. Most of the dimension data, on the other hand, will have a much lower cardinality. For instance, assuming the geographic region is the United States, the state attribute will have a cardinality of no more than 50 (possibly less than 50 if there are not sales in all states). Similarly, the store attribute is limited to a cardinality equal to the number of stores, the product attribute is limited to a cardinality equal to the number of sold products, and the date attribute is limited to the date range of sales. Thus, the typical dimension data attribute has a cardinality much lower than the cardinality of the fact data. When using the sales information with a multidimensional data cube, such as using the information with online analytical processing, this cardinality differential is one of the reasons for storing the fact data and the dimension data differently because it would be redundant to store the state for every 100 million sales when there are only 50 states. As is understood and appreciated by those having skill in the art, the redundancy is eliminated by storing dimension data in dimension tables, which subsequently improves the processing time for online analytical processing.

Notably, in the above example, the dimension order number has a cardinality close to or equal to the cardinality of the fact data because there is a unique order number identifying every sale. Where each sold item is given a specific order number, the cardinality of the fact data and the order number attribute would be equal. In contrast, where more than one sold item may be included within a larger order (e.g. where a consumer orders 10 items in one order), the cardinality of the order number attribute may not be equal to the fact data, but the cardinality of the order number attribute will still be far greater than the cardinality of other attributes (e.g. 50 million). In any event, as will be understood and appreciated by those having skill in the art, traditional multidimensional data cubes are not configured to handle dimension data attributes with such high cardinality. Other examples of high-cardinality attributes may include, among other things, a search query (e.g. 450,000,000 unique searches on MSN Search per month), a user ID (e.g. 200,000,000 unique users on MSN per month), or a page URL (millions of web pages on the Internet).

Even though high-cardinality attributes may have minimal value for querying (they are of such low granularity as to only return a single result), the information associated with high-cardinality attributes may still be interesting to users of multidimensional data cubes. For instance, using the business sale example, a user may query sales information initially by state, to obtain information about the sales in a particular state. Then, the user may drill-down by specifying a particular time frame for sales information, and sales information related to the state for the time frame will be presented. The user may yet wish to drill-down further, seeking information related to a single store on a single day. When the user's query has drilled down to a low level of granularity, such as a single store on a single day, order number information may be interesting to the user to characterize the sales of that day in that store.

Embodiments of the present invention provide multidimensional data cubes with high-cardinality attributes. Thus, in embodiments, the user discussed above may be presented with order number information, as if order number information were processed as a typical dimension attribute (e.g. state), even though the order number information is a high-cardinality attribute that has a cardinality at or near the cardinality of the fact data itself. To accomplish the processing and presentation of the high-cardinality attribute information, embodiments of the present invention store high-cardinality attribute data as if it were fact data. Moreover, embodiments of the present invention process high-cardinality attribute data as if it were fact data, materializing the data at query time instead of at the time of building the multidimensional data cube. Thus, when the exemplary user drills down to a threshold level of granularity, the information associated with the high-cardinality attribute will be materialized (as if it were fact data instead of dimension data) and presented to the user as a dimension.

Figure 2:
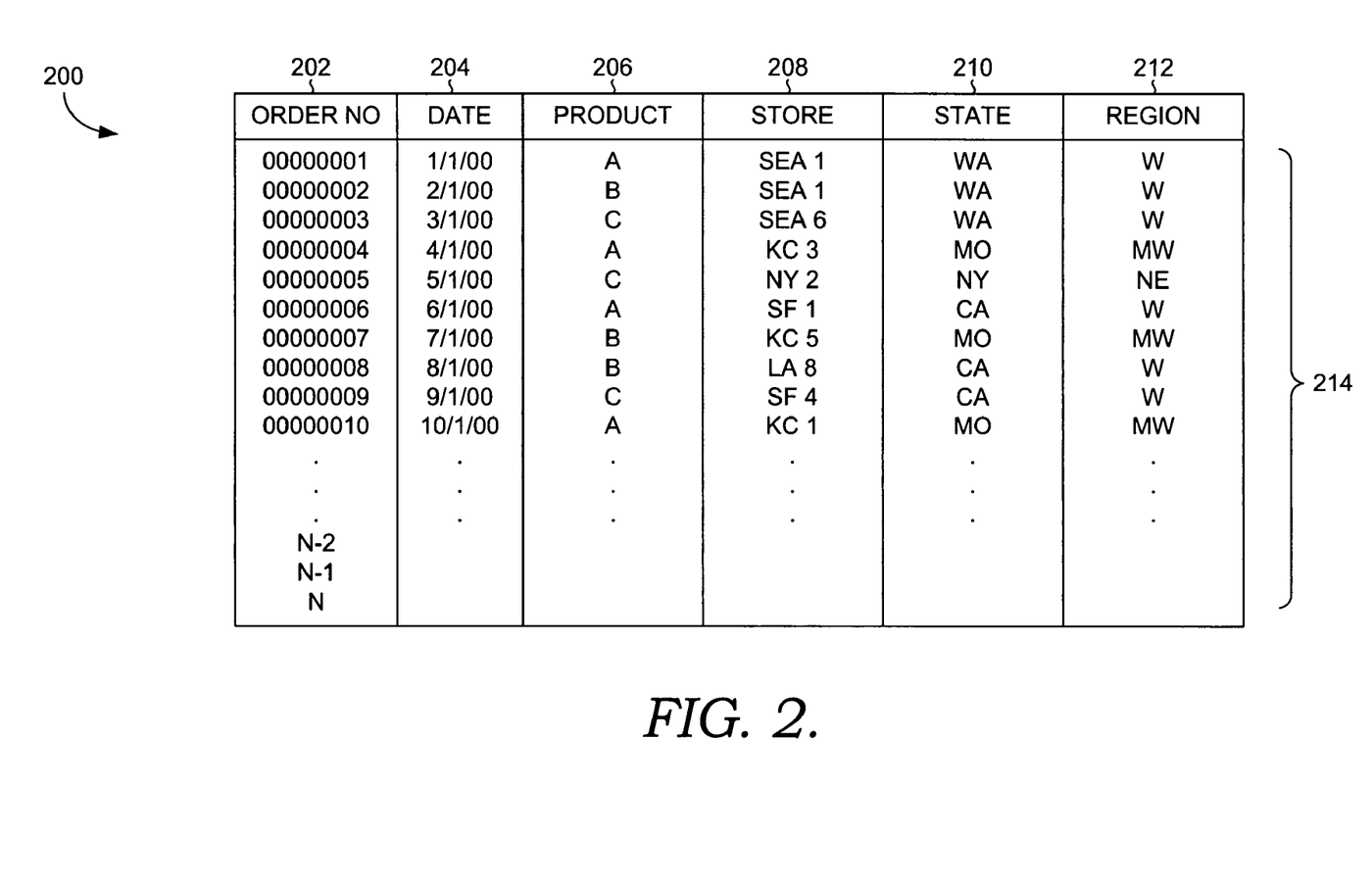
FIG. 2 is a block diagram illustrating an exemplary database for use with a multidimensional data cube with high-cardinality attributes, in accordance with an embodiment of the present invention.

Having provided an overview discussion of multidimensional data cubes with high-cardinality attributes for purposes of context, more specific exemplary embodiments of the present invention will be discussed herein. Turning now to FIG. 2, a block diagram is provided illustrating an exemplary database 200 for use with a multidimensional data cube with high-cardinality attributes, in accordance with an embodiment of the present invention. Database 200 includes an order number attribute 202, a date attribute 204, a product attribute 206, a store attribute 208, a state attribute 210, and a region attribute 212. Further each attribute in database 200 is populated with exemplary fact data 214. As illustrated, database 200 is a single database with business sale information. Information from database 200 will be extracted in order to build a multidimensional data cube having high-cardinality attributes, as discussed in more detail herein. Embodiments of the present invention are not limited to business sales information. Instead, it is contemplated and within the scope of the present invention that any database having a high-cardinality attribute may be used by embodiments of the present invention to build a multidimensional data cube having high-cardinality attributes. Further, embodiments of the present invention may build the multidimensional data cube from more than one database. A single database is illustrated here for simplicity and exemplary purposes to illustrate a high-cardinality attribute.

Here, date attribute 204, product attribute 206, store attribute 208, state attribute 210, and region attribute 212 are typical dimension attributes because each of these attributes has a relatively low cardinality compared to the fact data (assuming that N=100 million). More specifically, as previously discussed, each of attributes 204, 206, 208, 210, and 212, have a limited number of possible values (e.g. for state it is presumably 50 or less). Order number attribute 202, conversely, includes a unique identifier for each entry in database 200. Thus, order number attribute 202 has a cardinality of 100 million. Because the cardinality of order number attribute 202 is so high, embodiments of the present invention will, when building and querying a multidimensional data cube, treat order number attribute 202 as if it were fact data. Thus, order number attribute 202 will be stored as fact data and only materialized when a user querying a multidimensional data cube has drilled down to a threshold granularity and, at that point, the order number information will be presented to the user for the small subset of drilled down information. In embodiments, the threshold may be configurable. For instance, in embodiments, the threshold granularity may be set at a particular number of results (e.g. 100,000), so if there are less than that number of results, the high-cardinality attribute information will be displayed. In other embodiments, the threshold granularity may be set at a particular level for a dimension. For instance, if the geographic level is set at the store level, the order number information may be presented when the user has queried the multidimensional database to a granularity of at least the store level.

Figure 3:
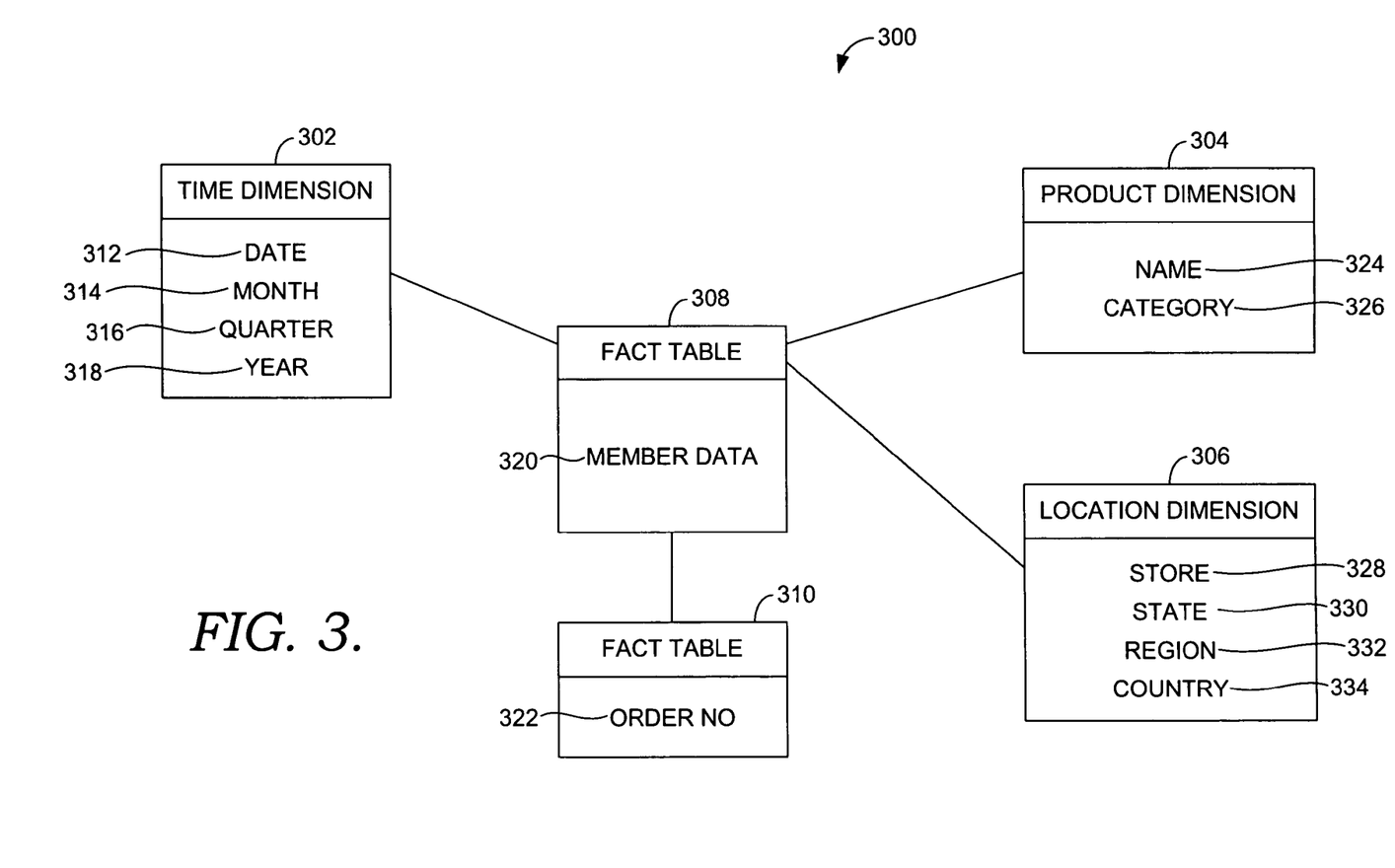
FIG. 3 is a block diagram illustrating an exemplary star schema format for extracting data from one or more databases for use with a multidimensional data cube with high-cardinality attributes, in accordance with an embodiment of the present invention.

Turning now to FIG. 3, a block diagram of an exemplary star schema format for extracting data from one or more databases for use with a multidimensional data cube with high-cardinality attributes, in accordance with an embodiment of the present invention, is illustrated and designated generally as reference numeral 300. Star schema 300 illustrates how embodiments of the present invention may process data, e.g. data from database 200 of FIG. 2, and organize the information as either fact data or dimension data. Star schema 300 includes time dimension 302, product dimension 304, location dimension 306, fact table 308, and fact table 310. Although illustrated as separate components in FIG. 3, fact table 308 and fact table 310 may actually be one fact table. Thus, the high-cardinality attributes will, in embodiments, be stored in the fact table. The separate tables are shown here for illustrative and discussion purposes, but are not intended to limit the scope of embodiments of the present invention to the particular configuration shown. Instead, it is contemplated and within the scope of the present invention that high-cardinality attributes may be stored as fact data in the fact table, along with the other fact data. Stated differently, although high-cardinality attribute tables and fact tables are described herein as separate components, that description is merely for illustrative purposes. It is contemplated and within the scope of the present invention that, in embodiments, the high-cardinality attribute table may be part of, and indeed indistinguishable from, the fact table. In those embodiments, there will be no separate high-cardinality attribute table and reference to the high-cardinality attribute table merely references the fact table as storing the high-cardinality attributes. As illustrated in this exemplary schema, time dimension 302 includes date attribute 312, month attribute 314, quarter attribute 316, and year attribute 318; product dimension 304 includes name dimension 324, and category dimension 326; location dimension 306 includes store dimension 328, state dimension 330, region dimension 332, and country dimension 334. Fact table 308 includes member data for each of the instances of sales from database 200 of FIG. 2. Because order number attribute 202 of FIG. 2 has a cardinality equal to the cardinality of the fact data, order number attribute 222 is stored in fact table 310, which is similar to fact table 308. As will be understood and appreciated by those having skill in the art, once processed into star schema 300, the information from database 200 of FIG. 2 will be used to build one or more multidimensional databases. In embodiments, the multidimensional databases will be configured to include one or more high-cardinality attributes, such as order number attribute 222, because the high-cardinality attributes will be processed and stored as fact data and will be materialized as dimension data at query time upon where the query scope passes the granularity threshold. Once materialized, the information associated with the one or more high-cardinality attributes will be presented to a user of the multidimensional databases as any other dimension.

Figure 4:
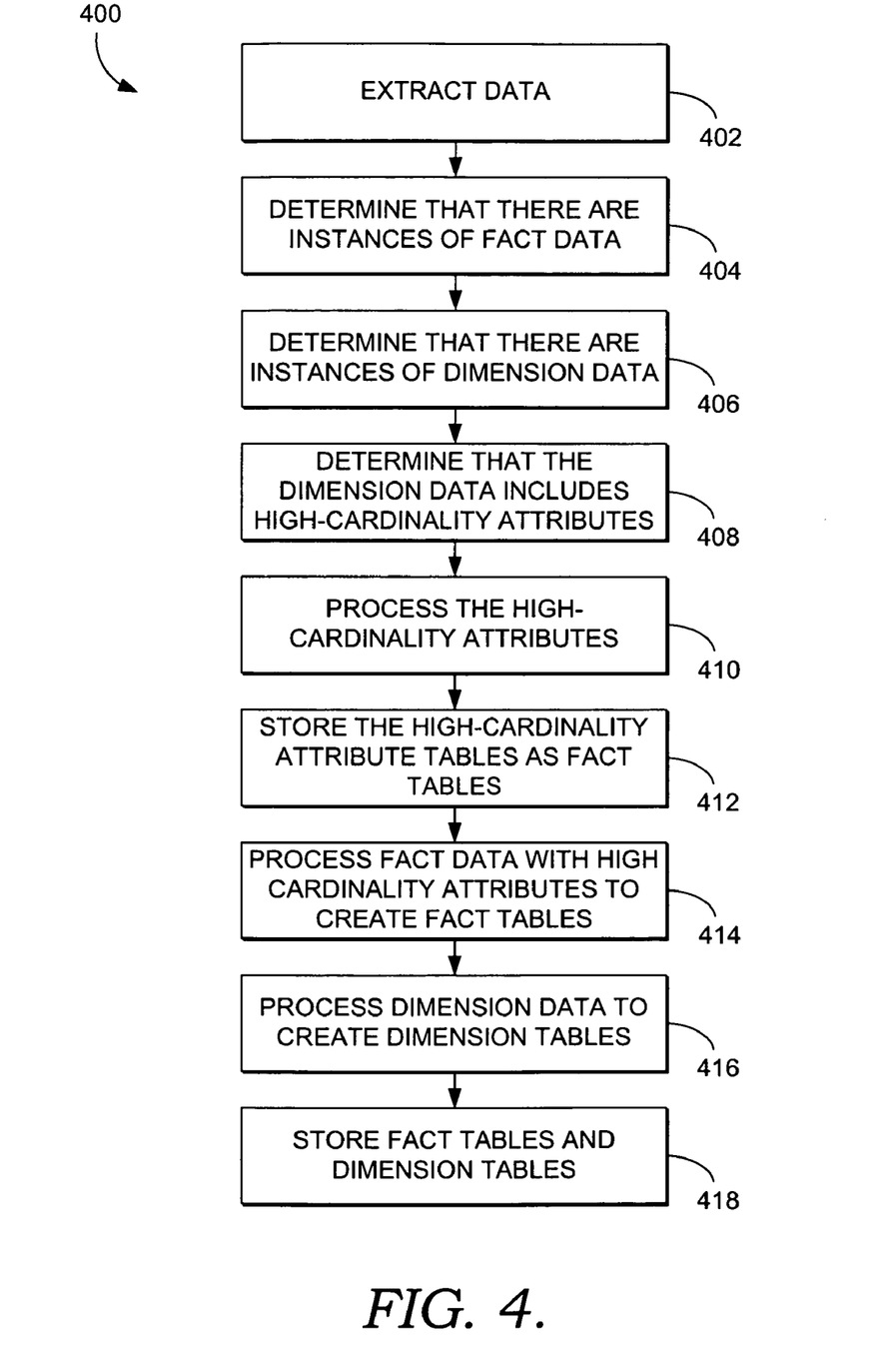
FIG. 4 is a flow diagram illustrating an exemplary method for building a multidimensional data cube, the multidimensional data cube having one or more high-cardinality attributes, in accordance with an embodiment of the present invention.

Turning now to FIG. 4, a flow diagram of an exemplary method for building a multidimensional data cube, the multidimensional data cube having one or more high-cardinality attributes, in accordance with an embodiment of the present invention, is illustrated and designated generally as reference numeral 400. Initially, as indicated at step 402, data is extracted from one or more databases, e.g. database 200 of FIG. 2. As previously discussed, data may be extracted from one database containing information for various aspects of the data for the multidimensional data cube. Or, in other embodiments, there may be various databases associated with one another, each containing part of the information for use with the multidimensional data cube.

Next, as indicated at step 404, it is determined that one or more instances of the data extracted from the one or more databases are fact data. As previously discussed, in embodiments, fact data includes members and each member is an instance of a dimension. Thus, where the dimension is state, one member of fact data may be WA. Next, as indicated at step 406, it is determined that one or more instances of the data are dimension data. In embodiments, dimension data is defined as data that includes an attribute for grouping fact data, such as store attribute 208 of FIG. 2.

At step 408, it is determined that one or more instances of the dimension data are high-cardinality attributes. For instance, in embodiments a high-cardinality attribute may be an attribute with a cardinality close to, or equal to, the cardinality of the fact data. Stated differently, where an attribute has a unique identifier for each instance of fact data, the cardinality of the attribute is equal to the cardinality of the fact data. In other instances the cardinality of the attribute may be close to, but not quite equal to, the fact data for a high-cardinality attribute. For instance, where the attribute is a search phrase on a search engine, the attribute is likely to have a very high cardinality because of all the searches in a given time period. There may be duplicate searches, however, so that even though the cardinality is very high, there is not quite a one-to-one correspondence between the search phrases and the individual searches. In embodiments, high cardinality may be determined by considering the difference between the cardinality of the attribute and the cardinality of the fact data. Where that difference is less than the difference between the cardinality of the attribute and the cardinality of other non-high-attributes in the dimension data, it may be determined that the attribute is a high-cardinality attribute. Other methods for determining high cardinality may also be employed. For instance, embodiments may take the median cardinality of all attributes and compare the cardinality of a single attribute to that median to determine high cardinality. Thus, embodiments of the present invention are not limited to any particular method for determining high cardinality. Each of the exemplary methods, and others, are contemplated and within the scope of the present invention.

Next, at step 410, the high-cardinality attributes are processed as the fact data to create one or more high-cardinality attribute tables that resemble one or more fact table structures. In embodiments, there may not be a separate table for the high-cardinality attributes. Instead, in these embodiments, the high-cardinality attributes are stored inside the fact table. Thus, although discussed as separate tables for illustrative purposes herein, the high-cardinality attribute tables may, in fact, be part of the fact table. As previously discussed, because of the high cardinality of the attribute, it is cumbersome to process the information as other dimension data would be processed. Thus, embodiments of the present invention process high-cardinality attributes as fact data. Further, at step 412, the high-cardinality attributes are stored as one or more fact tables on a computer storage medium.

Still further, at steps 414 and 416, the fact data and dimension data is processed to create one or more fact tables and one or more dimension tables. The fact tables and dimension tables may, in embodiments, be configured in a star schema arrangement for building multidimensional data cubes, as previously discussed and as illustrated in FIG. 3. The fact tables and dimension tables are stored on a computer storage medium at step 418.

Figure 5:
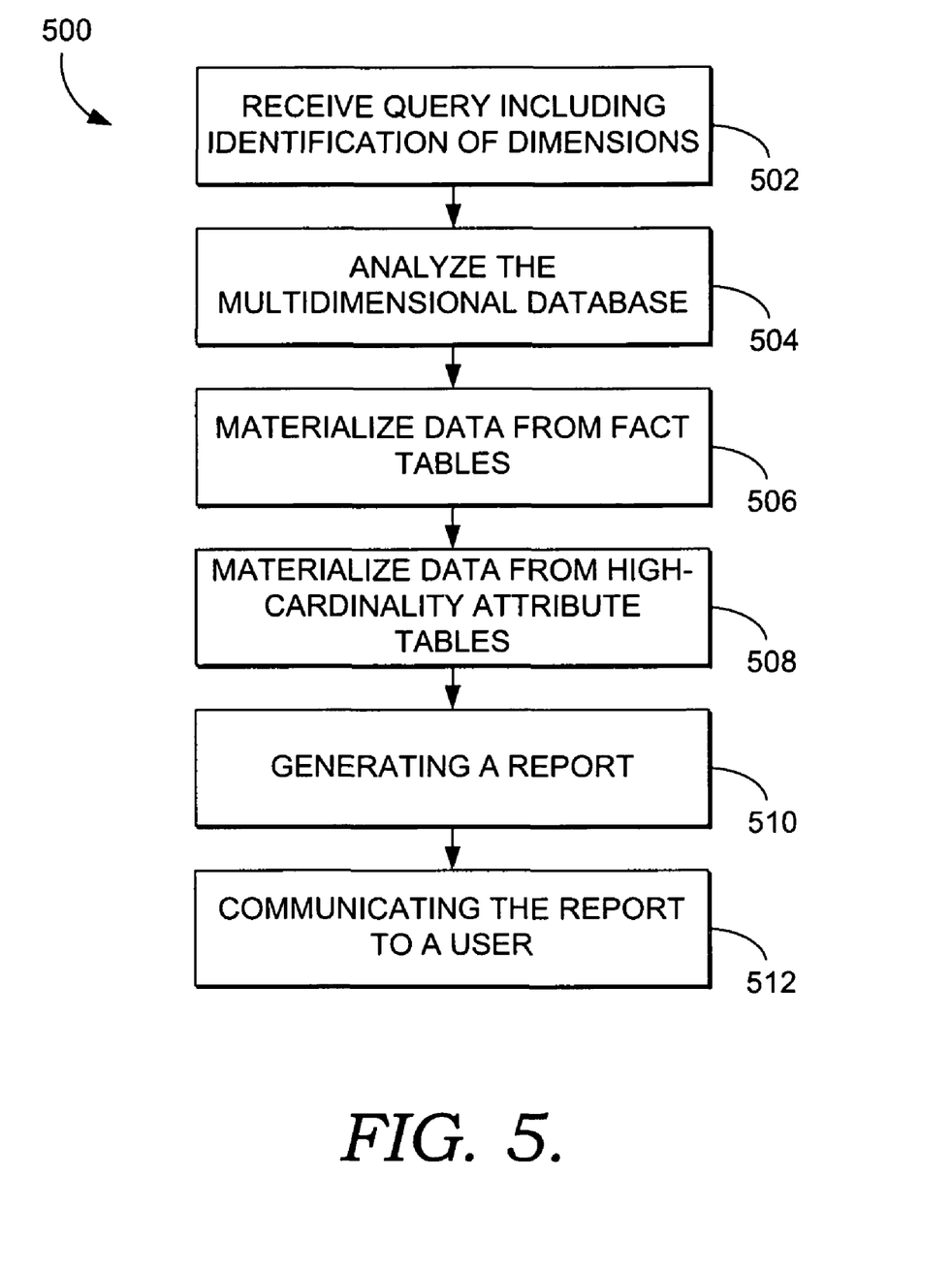
FIG. 5 is a flow diagram illustrating an exemplary method for querying a multidimensional database having one or more high-cardinality attributes, in accordance with an embodiment of the present invention.

Turning now to FIG. 5, a flow diagram of an exemplary method for querying a multidimensional database having one or more high-cardinality attributes, in accordance with an embodiment of the present invention, is illustrated and designated generally as reference numeral 500. Initially, as indicated at step 502, a query is received. The query may contain an identification of one or more dimensions. For instance, as previously discussed, a user querying business sales might include an identification of a particular region and a particular time frame that the user is interested in. In embodiments, the query may be received from a user of an online analytical processing program. In other embodiments, the online analytical processing program may use a multidimensional data cube in conjunction with comprehensive analytics to accommodate analysis and reporting as well as predictive analysis. For instance, there may be analysis and reporting of business information such as sales, web site traffic, advertisement success, e-commerce, or any number of analytics performed on databases or in data mining. Embodiments of the present invention contemplate that any number of analytical tasks may be performed using a multidimensional data cube and online analytical processing.

Next, at step 504 the multidimensional database is analyzed based upon the one or more dimensions. For instance, using the exemplary dimensions of region and time frame, the multidimensional database may be analyzed to retrieve information associated with the identified region and time frame. Next, at step 506, data from the fact tables is materialized to be presented to a user querying the multidimensional database. For instance, data will be retrieved from the fact tables that relate to the region and time frame identified by the user and that data will be used to populate a report.

At step 508, data is materialized from high-cardinality attribute tables. In embodiments, instead of materializing the attribute information upon building the data cube, high-cardinality attributes will be materialized at query time because of the fact-like nature of these attributes. Thus, where the user's query passes the threshold granularity, the high-cardinality attribute information will be materialized and the report will be populated with information related to the high-cardinality attribute. Using the example discussed above in which the high-cardinality attribute was order number, the order number information would be presented in addition to the other information to the user querying based upon a region and a time frame (assuming the region and time frame query met the threshold granularity).

At step 510 a report is generated including one or more instances of fact data corresponding to one or more dimensions. For instance, the information may be presented in a table format where the dimensions are the column and row headings and where the members of the fact data populate individual boxes of the table. Embodiments of the present invention, however, are not limited to any particular report format. Instead, it is contemplated and within the scope of the present invention that various report formats may be used to respond to a query. At step 512, the report that has been generated is communicated to a user. In embodiments, the report may be electronically reported, e.g. displaying the report on a computer monitor or sending the report via email.

In the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more computer-storage device having computer-executable instructions embodied thereon that, when executed, perform a method for building a multidimensional data cube having one or more high-cardinality attributes, the method comprising:
   extracting data from one or more databases;
   determining that one or more instances of the data are fact data, wherein each member of the fact data is one instance of a dimension;
   determining that one or more instances of the data are dimension data, wherein each instance of the dimension data includes an attribute for grouping the fact data;
   determining that one or more instances of the dimension data are high-cardinality attributes wherein cardinality is a measure of the number of unique values contained in an attribute;
   processing all of the one or more high-cardinality attributes as the fact data to create one or more high-cardinality attribute tables;
   storing the one or more high-cardinality attribute tables in one or more fact tables on a computer storage medium;
   building the multidimensional data cube without the one or more high-cardinality attributes; and
   presenting an information associated with the one or more high-cardinality attributes to a user when the user queries the multidimensional data cube beyond a predetermined threshold granularity.

2. The computer-storage device of claim 1, wherein the method further comprises:
   processing the fact data to create one or more fact tables;

processing the dimension data, other than the high-cardinality attributes, to create one or more dimension tables; and storing the one or more fact tables and the one or more dimension tables on the computer storage medium.

3. The computer-storage device of claim 2, wherein the one or more databases are one or more relational databases.

4. The computer-storage device of claim 3, wherein the difference between the cardinality of each high-cardinality attribute and the cardinality of the fact data is less than the difference between the cardinality of each high-cardinality attribute and the cardinality of the dimension data other than the high-cardinality attributes.

5. The computer-storage device of claim 4, wherein the one or more fact tables, the one or more dimension tables, and the one or more high-cardinality attribute tables are arranged in a star schema in which the one or more fact tables are at a center of the schema and the one or more dimension tables and the one or more high-cardinality attribute tables are connected to the one or more fact tables.

6. The computer-storage device of claim 5, wherein the method further comprises building one or more online analytical processing cubes from only the one or more dimension tables.

7. The computer-storage device of claim 6, wherein the multidimensional data cube is used in conjunction with comprehensive analytics to accommodate online analytical processing analysis and reporting as well as predictive analysis.

8. The computer-storage device of claim 7, wherein the cardinality of the one or more high-cardinality attribute tables is the same as the cardinality of the one or more fact tables.

9. One or more computer-storage device having computer-executable instructions embodied thereon that, when executed, perform a method for building a multidimensional data cube having one or more high-cardinality attributes, the method comprising:
extracting data from one or more databases;
determining that one or more instances of the data are fact data, wherein each member of the fact data is one instance of a dimension;
determining that one or more instances of the data are dimension data, wherein each instance of the dimension data includes an attribute for grouping the fact data;
determining that one or more instances of the dimension data are high-cardinality attributes wherein cardinality is a measure of the number of unique values contained in an attribute and wherein the cardinality of the one or more high-cardinality attributes is the same as the cardinality of the fact data;
processing the fact data to create one or more fact tables;
processing the dimension data, other than the high-cardinality attributes, to create one or more dimension tables; and
processing all of the one or more high-cardinality attributes as the fact data to create one or more high-cardinality attribute tables;
storing the one or more fact tables and the one or more dimension tables on a computer storage medium; and
storing the one or more high-cardinality attribute tables in one or more fact tables on the computer storage medium;
building the multidimensional data cube without the one or more high-cardinality attributes; and
presenting an information associated with the one or more high-cardinality attributes to a user when the user queries the multidimensional data cube beyond a predetermined threshold granularity.

10. The computer-storage device of claim 9, wherein the multidimensional data cube is used in conjunction with comprehensive analytics to accommodate online analytical processing analysis and reporting as well as predictive analysis.

11. A method for building a multidimensional data cube having one or more high-cardinality attributes, the method comprising:
extracting data from one or more databases;
determining that one or more instances of the data are fact data, wherein each member of the fact data is one instance of a dimension;
determining that one or more instances of the data are dimension data, wherein each instance of the dimension data includes an attribute for grouping the fact data;
determining that one or more instances of the dimension data are high-cardinality attributes wherein cardinality is a measure of the number of unique values contained in an attribute;
processing all of the one or more high-cardinality attributes as the fact data to create one or more high-cardinality attribute tables;
storing the one or more high-cardinality attribute tables in one or more fact tables on a computer storage medium;
building the multidimensional data cube without the one or more high-cardinality attributes; and
presenting an information associated with the one or more high-cardinality attributes to a user when the user queries the multidimensional data cube beyond a predetermined threshold granularity.

12. The method of claim 11, wherein the method further comprises:
processing the fact data to create one or more fact tables;
processing the dimension data, other than the high-cardinality attributes, to create one or more dimension tables; and
storing the one or more fact tables and the one or more dimension tables on the computer storage medium.

13. The method of claim 12, wherein the one or more databases are one or more relational databases.

14. The method of claim 13, wherein the difference between the cardinality of each high-cardinality attribute and the cardinality of the fact data is less than the difference between the cardinality of each high-cardinality attribute and the cardinality of the dimension data other than the high-cardinality attributes.

15. The method of claim 14, wherein the one or more fact tables, the one or more dimension tables, and the one or more high-cardinality attribute tables are arranged in a star schema in which the one or more fact tables are at a center of the schema and the one or more dimension tables and the one or more high-cardinality attribute tables are connected to the one or more fact tables.

16. The method of claim 15, wherein the method further comprises building one or more online analytical processing cubes from only the one or more dimension tables.

17. The method of claim 16, wherein the multidimensional data cube is used in conjunction with comprehensive analytics to accommodate online analytical processing analysis and reporting as well as predictive analysis.

18. The method of claim 17, wherein the cardinality of the one or more high-cardinality attribute tables is the same as the cardinality of the one or more fact tables.

* * * * *